large
3,152,040
PIPERAZINE-CARBON DISULFIDE COMPLEX FOR KILLING ROACHES
Virgil H. Fondren, 1123 Navigation, Corpus Christi, Tex.
No Drawing. Filed July 3, 1963, Ser. No. 292,746
4 Claims. (Cl. 167—33)

This invention relates to a method of killing insects and to an insecticidal article and method for making the same. More specifically, this invention relates to a method for ridding areas from infestations of cockroaches, and the article and method of making same.

As is well known, cockroaches present a severe infestation problem throughout the United States. The cockroach has been the subject of many research studies. The annual loss due to cockroach damage is recognized as a severe problem of critical importance. In addition to being aesthetically offensive to most people, they spread disease and do damage to all types of materials such as fabrics, books, cars, briefcases, furniture, and like articles of the homeowner. The damage to industry, the farms, kennels, and the like is great.

Accordingly, it is among the objects of this invention to provide effective methods and articles for killing cockroaches, which are simple to utilize and which present little or no danger to humans and domestic animals.

The active biological toxicant employed in the practice of this invention is a molecular complex of piperazine and carbon disulfide. The piperazine-disulfide complex is the equimolecular compound of piperazine and carbon disulfide having the empirical formula $C_5H_{10}N_2S_2$. The preparation of the compound has been described by Schmidt and Wichmann: Berichte 24, 3243 (1891); Herz: Berichte 30, 1585 (1897); and Pavolini and Gambarin: Ann. Chim. Applicata 39, 417 (1949). There is speculation by the various authors as to the precise structure of the complex. The complex is also called 1-piperazine carbodithioic acid betaine. The complex is a known anthelmintic in veterinary medicine as is disclosed in U.S. Patent Nos. Re. 24,657 and 2,951,009.

It has been found that the piperazine-carbon disulfide complex is surprisingly effective against the German cockroach (*Blatella germanica*) and, therefore, is believed equally effective against all cockroaches including the American cockroach (*Periplaneta americana*). Further, the complex, when incorporated with a suitable carrier, appears to be an attractant for cockroaches.

One method of practicing the invention involves distributing a lethal amount of the piperazine-carbon disulfide complex over areas known to be infested. The complex may be dusted over surfaces either as the undiluted solid or admixed with a suitable inert carrier, such as diatomaceous earth, flour or other finely divided carbohydrate foodstuff. Alternatively, solution or suspension of the complex may be sprayed or spread on surfaces in infested areas.

In the preferred embodiment an absorbent article such as cardboard, paper, or blotting paper, etc., is coated and/or impregnated with a solution or suspension of the piperazine-carbon disulfide complex and thereafter dried. The resulting coated and/or impregnated structure is then placed in the area of cockroach infestation. The cockroaches are attracted to the toxic structure and substantial numbers of the cockroaches die on the spot. If desired, the absorbent article may also contain foodstuffs such as sugar, molasses or edible oils which may be mixed with the impregnating solution or suspension.

The complex-impregnated carrier of this invention is essentially non-toxic to humans and domestic animals, and accordingly, there is virtually no danger involved in its use.

In the manufacture of the preferred absorbent-impregnated article of the invention, an aqueous suspension of the complex is preferably used, which preferably contains one or more suspending agents and surface active agents to render the suspension stable. The complex is preferably in a finely divided state such as prepared by milling or micronizing techniques. The concentration of complex in suspension is not critical; generally the suspension contains about 5 to 35% weight/volume. The absorbent article, such as paper, cardboard, or blotting paper, is saturated or coated with the suspension, dried, and is then ready for use.

The following examples illustrate the practice of this invention:

*Example I*

A commercial aqueous suspension of the piperazine-carbon disulfide complex was obtained having the composition as set forth in Example I of the U.S. Patent 2,951,009.

Heavy discs ³⁄₃₂ inch thick and 4 inches in diameter, of blotting paper in the form of drink coasters were coated with the suspension and then air dried. Six such impregnated sheets were distributed in the sink and cupboards of a Texas kitchen known to be infested with cockroaches after dark and the lights extinguished. The next morning many dead cockroaches were found on the sheets. The procedure was repeated on successive nights and no more cockroaches were observed after 48 hours, indicating that the infestation had been eliminated. In several other similar tests in Texas households, infestation was also eliminated in 48 hours. In further tests, several such impregnated discs were placed in an automobile which had a heavy infestation of cockroaches in the upholstery thereof. Infestation was eliminated after 48 hours. In an earlier test, the above suspension was spread over newspaper and the sheets dried. The coated sheets were spread over the floor of a dog kennel heavily infested with cockroaches. After the first night, large numbers of dead cockroaches some inches thick were found on the sheets. The procedure was repeated on successive nights and infestation was eliminated after the third night. The dogs housed in the kennel during this period suffered no apparent adverse effects on examination by the instant inventor, a veterinarian.

The following examples illustrate additional aqueous suspensions which may be used as impregnants:

*Example II*

| | Grs. |
|---|---|
| Piperazine-carbon disulfide complex, 10 micron particle size | 500 |
| Sorbitan monostearate (surfactant) | 20 |
| Polyoxyethylene monostearate containing about 40 | |
| Water, q.s. 10 liters. | |

*Example III*

| | Grs. |
|---|---|
| Piperazine-carbon disulfide complex, 10 micron particle size | 250 |
| Polyoxyethylene monostearate containing about 40 ethylene oxide groups per mol (surfactant) | 5 |
| Methylcellulose, 25 cps. (suspending agent) | 5 |
| Water, q.s. 1 liter. | |

In the preparation of the coated and/or impregnated sheets of the invention, pick-up of the suspension on the sheets will generally range in the neighborhood of 75% to 400% based on the weight of the dry, uncoated sheets.

It will be apparent to those skilled in the art that other solutions on suspensions of the complex may be used, and a wide variety of surfactants and suspending agents may be employed when aqueous suspensions are used. Similarly other absorbent base structures may be employed including porous sheets of cellulosic, animal or synthetic fiber material. The invention has been described in terms of examples which are to be considered illustrative rather than limiting and it is intended to cover all modifications and embodiments that fall within the spirit and scope of the appended claims.

I claim:

1. The method of killing cockroaches which comprises applying a lethal dose of the equimolecular complex of piperazine and carbon disulfide to an exposed surface in the area of infestation.

2. An insecticidal article for killing cockroaches comprising an absorbent sheet structure impregnated with a lethal quantity of the equimolecular complex of piperazine and carbon disulfide.

3. The article set forth in claim 2 wherein the absorbent sheet comprises a sheet of blotting paper.

4. The method of making an insecticidal article comprising impregnating an absorbent sheet with an aqueous suspension of a lethal quantity of the equimolecular complex of piperazine and carbon disulfide and removing the water therefrom by evaporation.

References Cited in the file of this patent

UNITED STATES PATENTS 2,951,009    Jensen  ---------------- Aug. 30, 1960